United States Patent
Sorensen

[11] 3,853,003
[45] Dec. 10, 1974

[54] WIND TUNNEL FLOW GENERATION SECTION

[75] Inventor: Norman E. Sorensen, Saratoga, Calif.

[73] Assignee: The United States of America as represented by the Administrator of the National Aeronautics and Space Administration, Washington, D.C.

[22] Filed: July 13, 1973

[21] Appl. No.: 379,019

[52] U.S. Cl. ............................................. 73/147
[51] Int. Cl. ........................................... G01m 9/00
[58] Field of Search ............ 73/147, 205 L; 138/39, 138/40, 44

[56] References Cited
FOREIGN PATENTS OR APPLICATIONS
836,385   6/1960   Great Britain ....................... 73/147

Primary Examiner—Donald O. Woodiel
Attorney, Agent, or Firm—Darrell G. Brekke; Armand G. Morin; John R. Manning

[57] ABSTRACT

A flow generation section for a wind tunnel test facility is described which provides a uniform flow for the wind tunnel test section over a range of different flow velocities. The throat of the flow generation section includes a pair of opposed boundary walls which are porous to the flowing medium in order to provide an increase of velocity in such medium by expanding the same through the porous walls. A plenum chamber is associated with the exterior side of each of such porous walls to separate the same from ambient pressure. A plurality of divider walls are positioned within each of such plenum chambers in spaced apart relationship to thereby divide the same into a plurality of successive volumes. A suction manifold communicates through appropriate suction lines separately with each one of the volumes, and valves are positioned in each of the lines to enable the degree of communication between each volume and the suction manifold to be independently varied. The length of the porous wall surfaces which are subjected to the negative pressure applied by the suction manifold can thus be changed by appropriately opening or closing successive ones of such valves. Partially opening each of the valves of the remaining volumes allows various negative pressure to be applied within the remaining volumes and thus control the uniformity and flow velocity at the exit of the flow generation section.

7 Claims, 2 Drawing Figures

PATENTED DEC 10 1974

3,853,003

WIND TUNNEL FLOW GENERATION SECTION

The invention described herein was made by an employee of the United States Government and may be manufactured and used by or for the Government for governmental purposes without the payment of any royalties thereon or therefor.

BACKGROUND OF THE INVENTION

This invention relates to wind tunnels and, more particularly, to a flow generation section of such a tunnel which is capable of generating a uniform flow for the wind tunnel test section over a range of different flow velocities.

Of major importance in the successful development of aircraft and space vehicles is the development of simulation facilities (wind tunnels) for subjecting test models to actual flight aerodynamic conditions. Such wind tunnels typically include a flow generation section for producing the desired flow conditions, as well as a test section within which the flight model to be tested is mounted and subjected to the flow. The flow generation section for producing transonic and supersonic flow is occasionally a porous wall one, i.e., one in which a pair of opposed walls providing a boundary for a flow passageway are made porous to provide an increase of velocity to the flow in the passageway by expanding the flowing medium through the porous walls.

Because wind tunnel test facilities are both expensive and time consuming to construct, it is desirable that a wind tunnel be useful for producing different flow velocities for subjecting models to differing aerodynamic conditions. The design criteria for porous wall flow generation sections, however, must be tailored to a specific flow velocity. That is, the length and porosity of the porous walls and the pressure behind the porous walls chosen for a flow generation section depends on the specific velocity increase and final velocity desired. Any significant deviation from such flow velocity in the flow generation section introduces error in the results of tests in the test section. More particularly, flow produced in a conventional wall flow generation section at any velocity other than the design velocity is generally not uniform because the pressure behind the porous walls of the flow generation section results in flow at the deviating velocity which is not truly uniform.

SUMMARY OF THE INVENTION

The present invention provides apparatus for generating acceptably uniform flow for the test section of a wind tunnel over a range of different flow velocities. More particularly, it has been found that by appropriately adjusting the length of the porous wall surfaces in the flow generation section of the wind tunnel to which a negative pressure is applied and by applying appropriate negative pressures thereto, the flow through the test section of the wind tunnel can be made uniform. In its basic aspects, therefore, the apparatus of the invention comprises a pair of generally opposed, porous wall surfaces defining the flow generation section, means for selectively applying appropriate negative pressures to the exterior sides of such porous wall surfaces, and means for selectively varying the length of such wall surfaces to which the negative pressure is applied.

The means for selectively varying the length and the appropriate pressures of the wall surfaces to which the negative pressure is applied desirably includes a plurality of suction means of one sort or another separately communicating with successive portions of the exterior side of the wall surface, and means for controlling the application of suction by each of such suction means independently of the application of the other of such suction means. Thus, activation or inactivation, as the case may be, of successive ones of such suction means enables the total wall length subjected to suction to be varied, and appropriate partial activation of the remaining suction means enables flow through the porous walls to provide uniform flow in the test section at the desired test section velocity.

Most simply, the plurality of separate suction means along successive portions of the exterior side of each of the porous wall surfaces includes a plenum chamber which isolates the exterior side surface from ambient pressure and one or more divider walls within the chamber separating it into a plurality of compartments spaced along the length of the porous wall. Means are provided for selectively applying a vacuum to each of such compartments to thereby provide such plurality of separate suction means along successive portions of the porous walls.

The invention includes other features and advantages which will be described or will become apparent from the following more detailed description of preferred embodiments thereof.

BRIEF DESCRIPTION OF THE DRAWING

With reference to the accompanying single sheet of drawing.

DETAILED DESCRIPTION OF PREFERRED EMBODIMENTS

Figure 1:
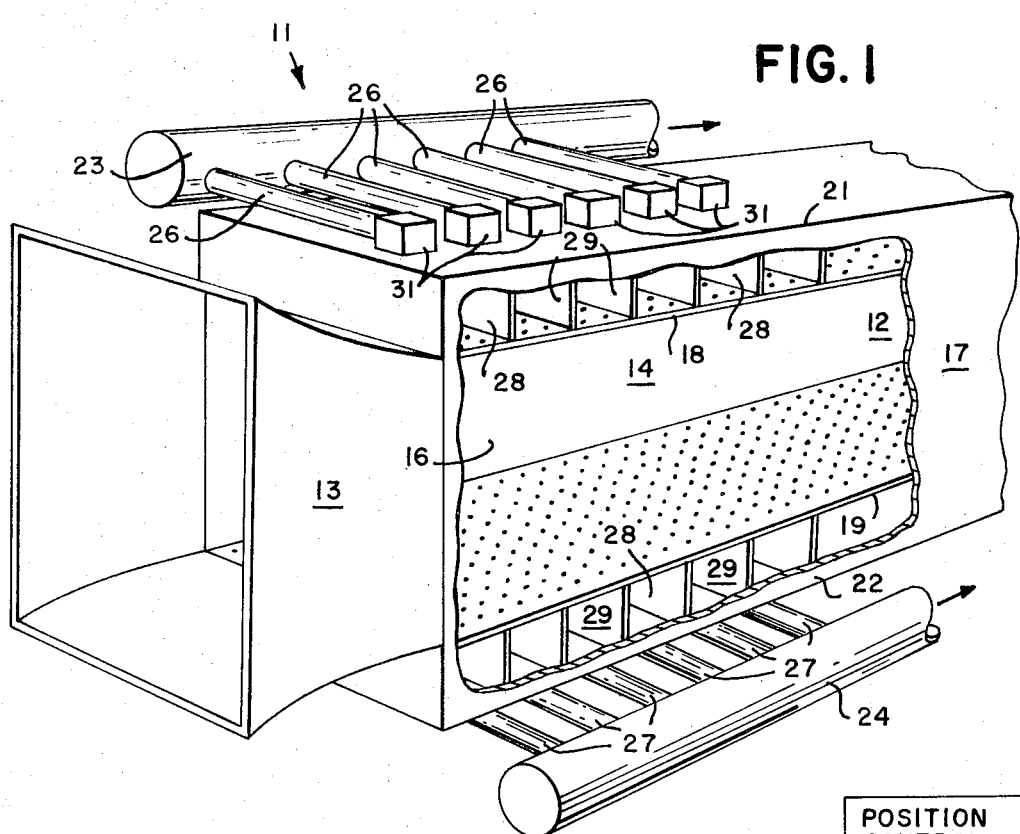
FIG. 1 is a perspective view with parts broken-away of a portion of a wind tunnel illustrating a preferred embodiment of the flow generation section of the invention.

With reference to the accompanying drawing, FIG. 1 depicts that portion of a transonic velocity wind tunnel test facility to which the present invention relates. More particularly, a flow generation section, generally referred to by the reference numeral 11, is illustrated immediately upstream of a wind tunnel test section 12 within which an aerodynamic model to be tested is positionable.

The flow generation section 11 includes, as is conventional, an entrance nozzle 13 for feeding subsonic flow into a throat section 14 within which the flow is brought to the desired transonic or supersonic velocity. Such velocity is achieved via an expansion process. More particularly, the throat section 14 is defined by a pair of solid side walls 16 and 17 and a pair of opposed, upper and lower walls 18 and 19 which are porous to flow therethrough of the high velocity fluid. As illustrated, such porosity is provided by a matrix of holes or apertures which extend through the wall. It will be appreciated, however, that other constructions, e.g., slots, can be used to provide the porosity. The important point is that the wall is porous (permeable) to the passage therethrough of the fluid which is within the flow generation section.

As illustrated, the matrix of holes extends along the length of each of the walls 18 and 19 into the test section 12 of the wind tunnel. The resulting porous walls in the test section are used, in accordance with conventional practice, to reduce shock wave reflections from the walls and inhibit shock wave boundary-layer induced distortions at the wall surfaces from being transmitted to the main flow.

The desired expansion of the fluid within the flow generation section is obtained by causing flow of a portion thereof through the walls 18 and 19 to the exterior of the throat. Means are thus provided for applying a negative pressure to the exterior side of each of the porous wall surfaces in order to cause flow through the wall. To this end, plenum chambers 21 and 22 are positioned respectively over the exterior sides of the walls 18 and 19 to separate the same from ambient pressure. Means are also provided for reducing the pressure in each of the plenum chambers. That is, a pair of suction manifolds 23 and 24, respectively communicate via suction distribution pipes or lines 26 and 27 with the chambers 21 and 22.

It will be appreciated that by the application of a vacuum or suction to the manifolds 23 and 24 with conventional pumping apparatus or by merely exhausting manifolds 23 and 24 to atmosphere when the tunnel ambient pressure is sufficiently higher than atmospheric pressure, the pressure within the plenum chambers is reducible to a desired extent. If such pressure is made negative relative to the pressure of flow through the wind tunnel throat, a portion of the flow in such throat will pass through the apertures in the planes 18 and 19. This results, in effect, in an expansion of the flow in the nozzle throat with a consequent increase in its velocity when the entrance nozzle 13 is choked (Mach number equal to one). In this manner, the transonic or supersonic velocity desired to be introduced into the test section is produced.

In general, the flow generation sections of existing wind tunnels having fixed side and upper walls are designed to provide a specific velocity within the test section. That is, the size and distribution of the apertures in the walls 18 and 19 are chosen to provide, with a set "back pressure" or suction on the manifolds 23 and 24, an accurately varying expansion pressure differential along the length of the throat section to produce a specific velocity change in the air flow. It has been proposed that different velocities be achieved by merely changing the pressure behind the porous walls 18 and 19, i.e., changing the back pressure, to thereby provide a different velocity increase within the throat section. It has been found, however, that such a solution is not satisfactory for accurate work. More particularly, although a different velocity may be thus achieved in the test section, the flow at the exit of such section at such different velocity is not uniform.

As a particularly salient feature of the instant invention, it includes as part of the flow generation section apparatus which assures that a uniform flow is obtained over a range of flow velocities. More particularly, it has been found that upon appropriately adjusting the length of the porous wall surfaces in the flow generation section of the wind tunnel to which a negative pressure is appropriately applied, the flow through the test section of the wind tunnel can be made uniform over a range of different transonic and supersonic velocities. The invention therefore includes apparatus in combination with that described for varying the length of the porous walls 18 and 19 to which the negative pressure supplied by the manifolds 23 and 24 are subjected. More particularly, each of the plenum chambers 21 and 22 is divided into a plurality of compartments 28 by divider walls 29. As illustrated, such divider walls are equally spaced apart transversely along the inner side of the porous walls 18 and 19, and hermetically separate the compartments 28 from one another. The divider walls thus divide the exterior side of each of the porous walls into a corresponding plurality of successive portions which are isolated from one another. The number of compartments 29 into which the plenum chambers are divided depends on the range of velocities to be covered and the uniformity desired for the test section flow.

From the above, it will be appreciated that the pressure on each of the successive portions of the exterior side of each porous wall can be made independent of the pressure on the others. In this connection, each of the suction lines 26 and 27 communicates with a respective one of the compartments 28 through a valve 31. Each valve 31 enables control of the suction applied to its associated compartment 28 independently of the suction provided to the other compartments. Moreover, it will be appreciated that the valves enable one to selectively prevent the application of the suction to selected ones of the compartments to thereby enable the length of the porous walls to which the suction is applied to be varied.

In designing a flow generation section for a wind tunnel in accordance with the invention, the total length of the section and porosity of the walls 18 and 19 are calculated based upon the maximum flow velocity it is desired to achieve in the flow generation section. That is, the porous distribution for the walls 18 and 19 is calculated using known porous flow coefficients and assuming the distributed flow expansion required through the porous walls follows that of a conventional transonic wind tunnel nozzle shape designed for the maximum desired exit velocity. For convenience in making this calculation, the back pressure required in each plenum chamber is assumed to be the same for the resulting porous distribution. The highest Mach number at which the flow generation section is to operate also controls the longest length of the porous walls 18 and 19. Other, lower velocities for the flow generation section are calculated by again using known porous flow coefficients and assuming the distribution of flow expansion required through the porous walls follows that of a conventional transonic nozzle shape but at less than the highest Mach number.

In operation, velocities lower than the maximum design velocity are then achieved by successively closing the valves to the compartments as the velocity desired decreases, starting with the valve to the most down stream compartment as the first to close and working up stream therefrom, and increasing the back pressure in the open compartments. The number of compartments to be closed and the required back pressure increase for any particular desired velocity is determined by the calculation of the optimum length and back pressure that a flow generation section should have to provide the desired velocity with the wall porosities and flow distribution maintained fixed in accordance with the constructed flow generation section. At Mach number 1 all valves are closed and the back pressure in each chamber is merely the static pressure on the porous walls.

The back pressure in the compartments remaining in communication with the suction manifolds for any velocity is applied as prescribed in the following example.

EXAMPLE

The flow generation section for a transonic wind tunnel test facility was designed in accordance with the invention to produce uniform wind flow at velocities ranging from Mach 1.4 to Mach 1.15. The flow passageway was rectangular in cross-section (throat height equalling twice its width) and the porous walls and the solid side walls in the flow generation section were parallel and had a relative length of 2.2 times the throat half height. The plenum chamber over each of the porous walls was equally divided into six chambers. The following Table I sets forth the calculated ratio of the total pressure in each of such compartments to the total pressure provided by the flowing stream. Table I also sets forth those compartments which are closed to communication with the suction manifolds in order to limit the active length of the porous walls.

TABLE I

BACK PRESSURE RATIO

| Compartment Number | $x/h_{th}/2$ | Mach Number | | | |
|---|---|---|---|---|---|
| | | 1.15 | 1.20 | 1.30 | 1.40 |
| 1 | 0–.4 | .449 | .398 | .310 | .200 |
| 2 | .4–.8 | .468 | .425 | .345 | .200 |
| 3 | .8–1.2 | .482 | .445 | .344 | .200 |
| 4 | 1.2–1.6 | closed | closed | .363 | .200 |
| 5 | 1.6–2.0 | closed | closed | .390 | .200 |
| 6 | 2.0–2.2 | closed | closed | closed | .200 |

The compartments are numbered in the above table consecutively beginning with the most up stream compartment, and the back pressure ratio is defined as the ratio of total pressure in each plenum chamber to the total pressure in the free stream.

The porosity of the walls varies along the longitudinal axis of the test section in this manner.

TABLE II

HOLE PATTERN

| $x/h_{th/2}$ | | $A_{bl}/A_{th/2}$ | N |
|---|---|---|---|
| .04 | – .2 | .0329 | 100 |
| .2 | – .4 | .0630 | 125 |
| .4 | – .6 | .0718 | 125 |
| .6 | – .8 | .0698 | 125 |
| .8 | – 1.0 | .0645 | 125 |
| 1.0 | – 1.2 | .0620 | 125 |
| 1.2 | – 1.4 | .0511 | 125 |
| 1.4 | – 1.6 | .0473 | 125 |
| 1.6 | – 1.8 | .0349 | 125 |
| 1.8 | – 2.0 | .0230 | 125 |
| 2.0 | – 2.2 | .0111 | 125 |

In both of the above tables, x equals the distance along the longitudinal axis of the throat section wherein the origin is located at the up stream end of the porous wall; $h_{th}$ is the throat height; $A_{bl}/A_{th/2}$ equals the total bleed hole area divided by half the throat area of the flow generation section; and N is the suggested number of holes.

Figure 2:
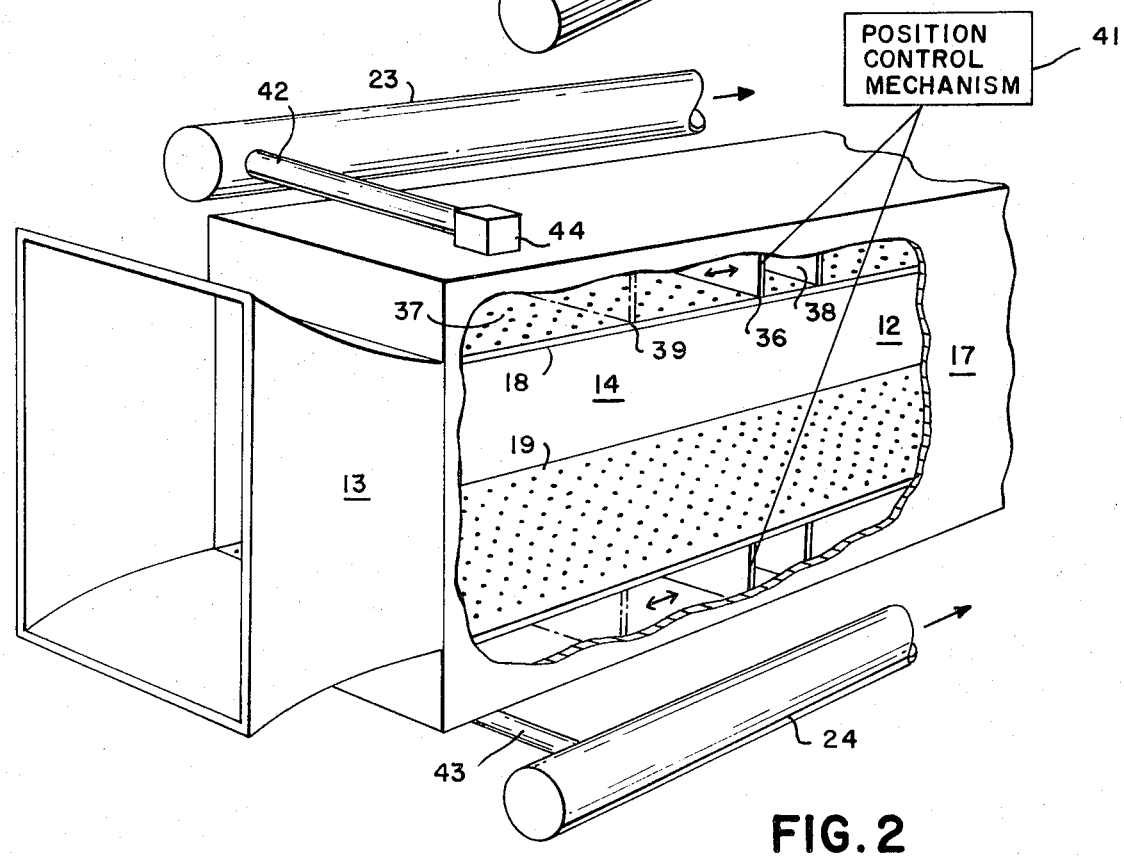
FIG. 2 is a perspective, partially broken-away view of a wind tunnel illustrating another preferred embodiment of the flow generation section of the invention.

FIG. 2 illustrates another embodiment of the invention which is simplified for use primarily in those situations in which the uniformity of the flow is not as critical. That is, although the embodiment of such figure provides more uniform flow over a range of velocities than prior apparatuses, it does not do so with the same degree of control as the embodiment of FIG. 1. More particularly, with reference to such figure, it will be seen that the flow generation section disclosed therein is in most respects the same as that of the previously described embodiment. In this connection, those parts of this embodiment which are the same as the corresponding parts of the earlier described embodiment are referred to by like reference numerals.

Instead of each of the plenum chambers associated with each porous wall having a plurality of divider walls therein, only one of such walls 36 is provided therein dividing the same into two hermetically separated compartments or volumes 37 and 38. As indicated in phantom at 39, however, each wall 36 is selectively movable within its associated chamber along the length of the porous wall to vary the length of the porous wall covered by each of the compartments 37 and 38. In this connection, position control means, such as a lead screw for each of the walls 36, is diagramatically indicated at 41. Each wall 36 is positioned, however, opposite each other at the same longitudinal station.

The suction manifolds 23 and 24 are each connected to the plenum chamber with which they are associated by only one suction line 42 and 43 respectively so that only one back pressure can be applied to compartments 38. Each of the suction lines 42 and 43 includes a valve 44 for controlling the back pressure in compartment 38.

The criteria controlling the design of this embodiment is the same as that described in connection with the embodiment of FIG. 1. Thus, the apparatus is designed for the maximum flow velocity it is desired to achieve with the flow generation section. Such maximum velocity is obtained by applying the negative pressure supplied by the suction manifolds to the full length of the porous walls through the suction lines 42 and 43. If it is desired to reduce such velocity, then the wall 36 is positioned to provide the optimum length of porous wall on the up stream side of such wall, and the valves 44 are controlled to apply the negative pressure only to such up stream portion of the porous walls.

Although the invention has been described in connection with preferred embodiments thereof, it will be recognized by those skilled in the art that various changes and modifications can be made without departing from the spirit of the invention. It is therefore intended that the coverage afforded applicant be limited only by the claims and their equivalent language.

I claim:

1. In the flow generation section of a high velocity wind tunnel, apparatus for generating improved flow over a range of flow velocities comprising a pair of generally opposed, porous wall surfaces defining a flow throat of said flow generation system, means for applying a negative pressure to the exterior sides of said porous wall surfaces, means for selectively varying the length of said wall surfaces in the direction of flow thereby to which said negative pressure is applied, and means for selectively varying the amount of said negative pressure.

2. The apparatus of claim 1 for generating improved flow over a range of flow velocities for a wind tunnel, wherein said means for selectively varying the length of said wall surface in the direction of flow thereby to which said negative pressure is applied includes a plurality of suction means communicating with successive portions of the exterior side of said wall surface along the length thereof for separately applying negative pressures to said successive portions, and said means for selectively varying the amount of said negative pressure includes means for controlling the application of suction by each of said suction means to its associated portion of said wall exterior side independently of the application of the other of said suction means.

3. The apparatus of claim 1 for generating improved flow over a range of flow velocities for a wind tunnel, wherein said means for applying a negative pressure to the exterior sides of said porous wall surfaces includes for each of said porous wall surfaces a plenum chamber separating the exterior side thereof from ambient pressure and means for reducing the pressure within said plenum chamber, and wherein said means for selectively varying the length of said wall surfaces includes for each of said surfaces at least one divider wall positioned within the plenum chamber associated with said surface, which divider wall extends across the widthwise direction of the exterior side of said surface to thereby separate a portion thereof to which a negative pressure is applied from the remainder thereof.

4. The apparatus of claim 3 for generating improved flow over a range of velocities for a wind tunnel, wherein a plurality of said divider walls are positioned within each of said plenum chambers in spaced apart relationship along the length of said exterior side of said porous wall surface to thereby divide the same into a plurality of successive portions, and wherein said means for reducing the pressure in said plenum chamber includes means for reducing the pressure in each of said compartments independently of the pressure in other ones of said compartments whereby the length of said wall surface to which said negative pressure is applied is adjustable by reducing the pressure only in selected ones of said compartments.

5. The apparatus of claim 4 for generating improved flow for a wind tunnel, wherein said means for reducing the pressure in said plurality of compartments includes a suction manifold and a plurality of suction lines, each one of which communicably extends between said manifold and a respective one of said plenum chamber compartments; and said means for selectively varying the amount of said negative pressure includes a valve associated with each of said lines for varying the degree of communication between said suction manifold and the compartment to which said line is connected.

6. The apparatus of claim 3 for generating improved flow for a wind tunnel wherein position control means are included for varying the position of each of said divider walls within its associated chamber along the length of said exterior surface of said wall surface, and wherein said means for reducing the pressure in said plenum chamber includes means for reducing the pressure in said chamber on the up stream side of said divider wall.

7. The apparatus of claim 6 for generating uniform flow for a wind tunnel wherein said means for reducing the pressure in said chamber on said side of said divider wall includes a suction manifold, a suction line communicably extending between said manifold and said plenum chamber on the up stream side of said divider wall; said means for selectively varying the amount of said negative pressure includes a valve associated with said line for varying the degree of communication between said suction manifold and the chamber volume to which said line is connected.

* * * * *